Sept. 30, 1924.  
F. L. HAINES  
COOKER FOR AUTOMOBILES  
Filed April 1, 1922

1,510,054

Inventor  
Fuhrman L. Haines.  
By A. J. O'Brien  
Attorney

Patented Sept. 30, 1924.

1,510,054

UNITED STATES PATENT OFFICE.

FUHRMAN L. HAINES, OF DENVER, COLORADO.

COOKER FOR AUTOMOBILES.

Application filed April 1, 1922. Serial No. 548,767.

*To all whom it may concern:*

Be it known that I, FUHRMAN L. HAINES, a citizen of the United States, residing at the city and county of Denver and State of Colorado, have invented certain new and useful Improvements in Cookers for Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to cookers adapted to receive their heat from the exhaust gases of an internal combustion engine.

Since the advent of the automobile, people have inaugurated a custom of overland travel, which has already assumed great proportions and in many places, especially in the Western States, the roads oftentimes assume the appearance of a continuous procession. It is customary for these automobile tourists to carry camping outfits and to camp along the roadside wherever night overtakes them, and to carry and cook their own food. Owners of automobiles who cannot take long trips, go as far as their time will permit and spend their Sundays or holidays in the mountains or by some convenient river or lakeside. In both cases pointed out above the people desire warm food for their meals and come variously equipped to prepare it.

It is the object of this invention to prepare a receptacle that can be heated from the exhaust of the engine, and to so design the same and the parts connected therewith that the food which it is planned shall be eaten for lunch may be put in place in the morning before the start is made and the heat turned on a sufficient time before lunch to enable the food to get warmed or cooked. In this manner a hot meal can be served a short time after stopping the car.

Where it is merely desired to keep hot food warm, the food may be placed in the container and the heat turned on for a short time, and periodically turned on and off sufficiently to keep the contents from cooling.

It is, furthermore, the object of this invention to employ in my device the principle of the pressure cooker, which I do by employing as the food chamber an aluminum pot having a steam tight cover which is held yieldingly in place so as to prevent explosions.

In order to more clearly describe my invention, I shall have reference to the accompanying drawing in which—

The same reference numerals will be used to indicate the same parts throughout the several views.

Figure 2:
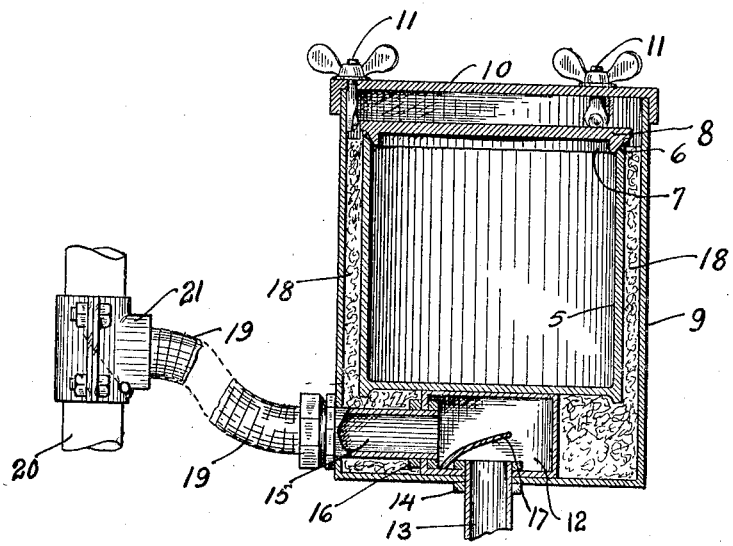
Fig. 2 shows a vertical central section through my improved cooker.
Figure 3:
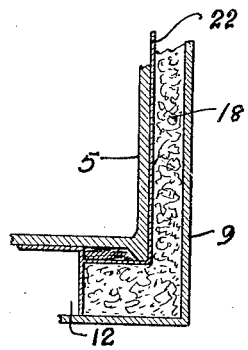
Fig. 3 is a detail showing a modified construction.
Figure 1:
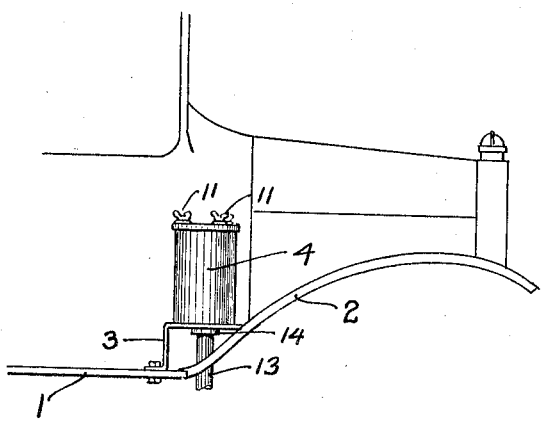
Fig. 1 shows a side elevation of a car equipped with my cooker.

Numeral 1 represents the running board of an automobile, and 2 the right front fender, to which is secured by means of suitable brackets 3 my improved exhaust cooker 4, which is shown in section in Fig. 2, and which will now be described in detail. The inside food or cooking compartment is formed, preferably, by an aluminum pot or vessel 5, which has its upper inside edge slightly tapered as indicated by numeral 6, and serves as a seat for the downwardly extending flange 7 of cover 8. The outer vessel 9 may be made of sheet iron of suitable thickness and provided with a cover 10 which is held in place by screws 11 or other suitable means. In the bottom of the outer vessel 9 I place a round or rectangular box 12 which is clamped securely to the bottom of the outer vessel by means of a pipe 13 and nuts 14. A second pipe 15 extends through the side of the outer container 9 and is clamped to the side of the box 12 by means of nuts 16, in the manner shown. A deflector plate 17 in box 12 serves to direct the hot gases upwardly against the top of the box in a manner hereinafter explained. The aluminum pot 5 rests directly upon the upper surface of box 12 and the space between it and the container 9 is filled with heat insulating material 18. A flexible pipe 19 serves to connect the end of pipe 15 with the exhaust pipe 20, and is connected to the latter by means of a valve 21 which may be opened to permit the hot gases to be diverted through pipes 19 and 15 into the box 12, where the deflector will force them in an upward direction against the top of box 12 from whence they pass out through pipe 13. The hot gases passing through box 12 in a continuous stream will cause the latter to become heated and this heat will be transferred to pot 5. Food may be placed in pot 5 and thoroughly cooked in a reasonable time by means of the heat thus abstracted from the exhaust gases.

In order to enable the pot 5 to be readily removed and inserted so that it may be thoroughly cleaned, I propose to provide an inner wall 22 between which and the inside of wall 9 the heat insulating material is packed, and in this manner the pot 5 may be removed or inserted without disturbing the heat insulating material. The cover 8 is shown as resting freely upon the upper end of pot 5. Care must, however, be taken to permit the cover to yield should the pressure increase to a dangerous amount.

I have shown my cooker as circular in section, but it may be made rectangular or of any desired shape.

Having now described my invention, what I claim is—

1. In a cooker adapted to be heated by hot gases, a container, a pot within said container and spaced therefrom by means of heat insulating material, a heat box within the container said box having its upper surface in contact with the bottom of the pot, a pipe leading into said heat box through one side thereof, a second pipe connected to the bottom of said box and a deflector plate in said box between said pipes.

2. A cooker adapted to be heated by means of hot gases, comprising, in combination, a pot, an outer container surrounding the same and spaced therefrom by heat-insulating material a heat box resting on the bottom of said container and having its upper surface in contact with the bottom of the pot, an inlet pipe extending through the side of the container and through the side of the heat box, means for securing the ends of the pipe to the heat box with a gas-tight joint, an outlet pipe extending through the bottom of said heat box and said container, and a deflector plate in said box, said deflector plate being secured to the box near the inlet pipe and below the same and being upwardly inclined.

3. A cooker adapted to receive its heat from hot gases, comprising a container, a heat box located therein, an inlet pipe connected to said box, and outlet pipe secured to the box, and means within the box for deflecting the hot gases upwardly against the upper surface of the box.

4. A cooker adapted to receive its heat from hot gases, comprising a container, a heat box located therein, an inlet pipe connected to said box, an outlet pipe secured to the box, and means within the box for deflecting the hot gases upwardly against the upper surface of the box, said means comprising a deflector plate.

In testimony whereof I affix my signature.

FUHRMAN L. HAINES.